June 2, 1931.  A. L. BROUSSARD  1,807,728
PNEUMATIC TIRE
Filed Aug. 23, 1929    2 Sheets-Sheet 2
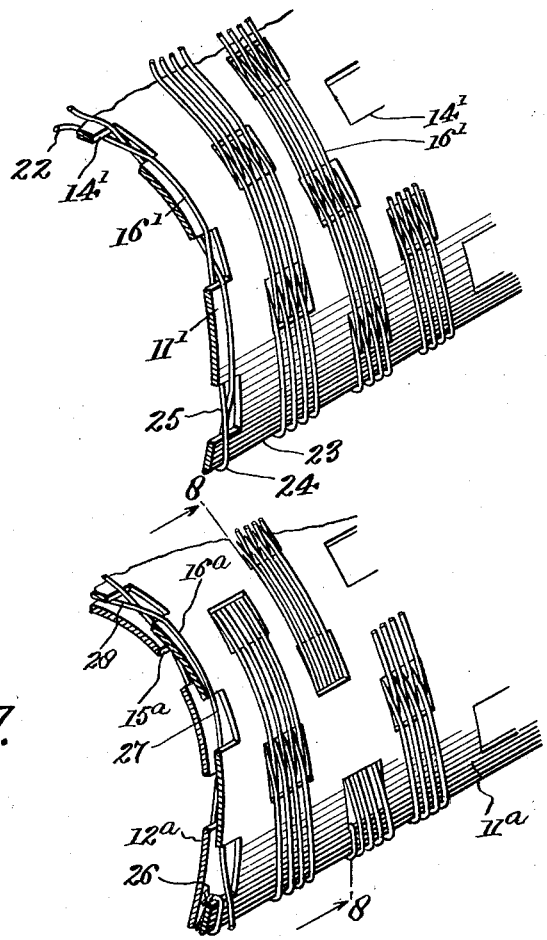
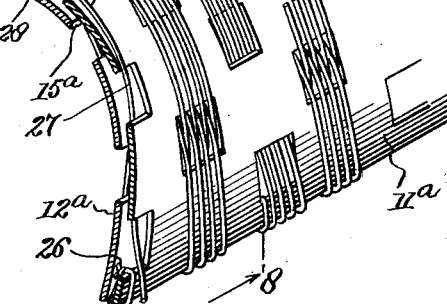
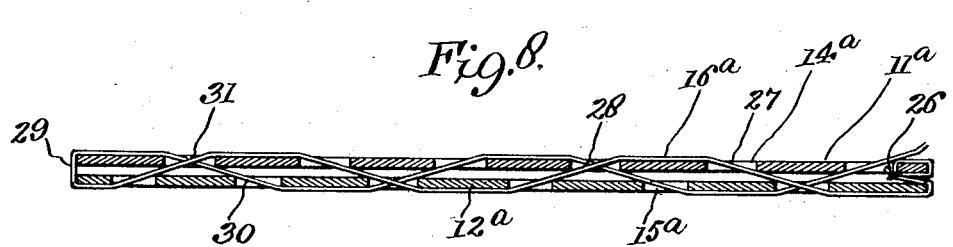
Inventor
A. L. Broussard
By Wilkinson & Giusta
Attorneys.

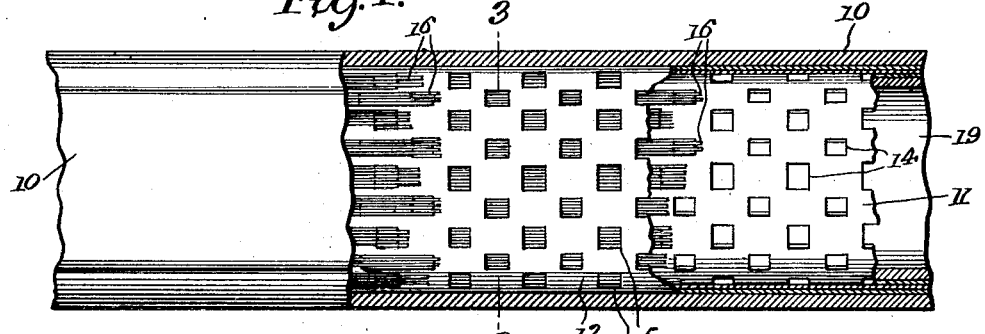
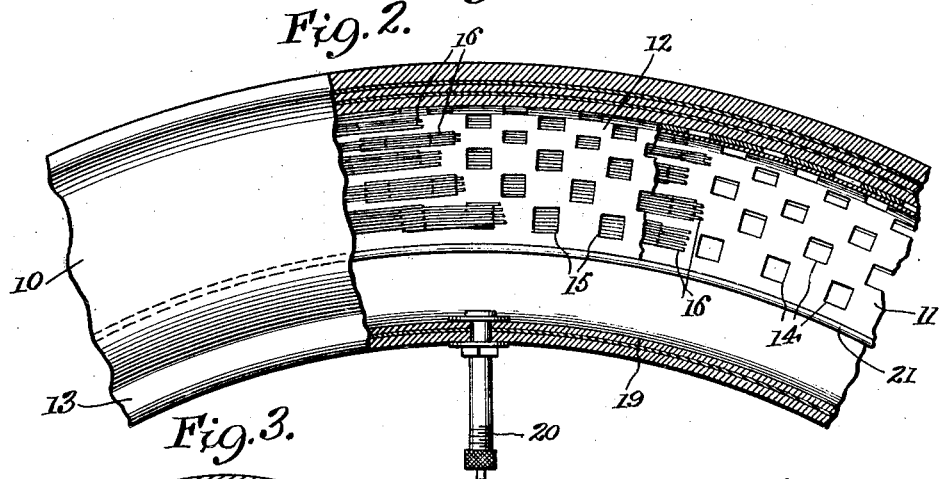
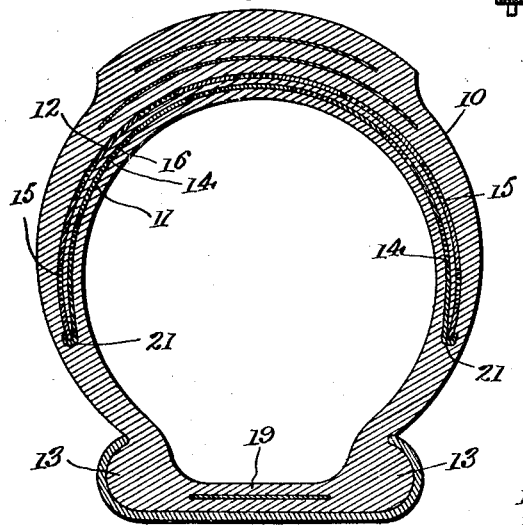
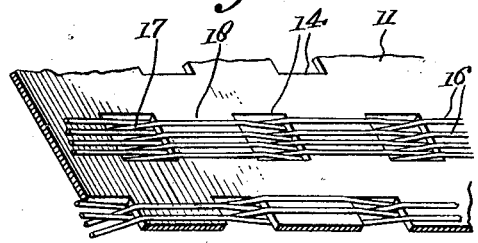
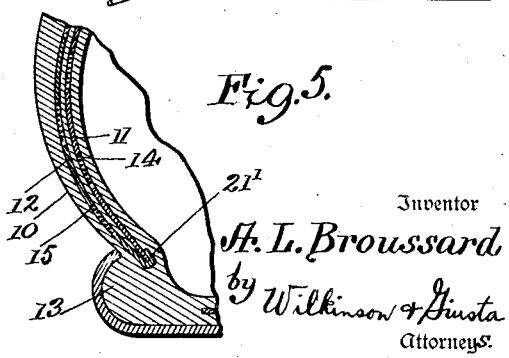

Patented June 2, 1931

1,807,728

UNITED STATES PATENT OFFICE

ANDRE L. BROUSSARD, OF NEW ORLEANS, LOUISIANA, ASSIGNOR OF NINE-TENTHS TO E. O. BROUSSARD, OF NEW ORLEANS, LOUISIANA

PNEUMATIC TIRE

Application filed August 23, 1929. Serial No. 387,998.

The present invention relates to improvements in pneumatic tires and has for an object primarily to promote safety in automobiles, airplanes, and other vehicles using pneumatic tires.

Another object of the invention is to provide an improved pneumatic tire which shall be substantially for all purposes puncture and blow out proof, and which will, at the same time, retain the same resiliency as now possessed by pneumatic balloon tires of conventional construction.

A further object of the invention resides in providing an improved pneumatic tire in which the inner tube, as at present employed, is dispensed with, and the air chamber provided directly in the outer casing or shoe, whereby the expense of tire manufacture is to this extent reduced.

A still further object of the invention is to provide an improved pneumatic tire in which a metallic sheathing is employed in combination with a woven cord arrangement whereby the sheathing may be vulcanized and properly incorporated in the carcass of the tire, so as to readily combine therewith and form a unitary tire structure, in which the metal sheathing will not be apt to cut through the rubber and fabric of the casing.

With the foregoing and other objects in view, the invention will be more fully described hereinafter, and will be more particularly pointed out in the claim appended hereto.

In the drawings wherein like symbols refer to like or corresponding parts throughout the several views, Figure 1 is a plan view, with parts broken away and parts shown in section of an improved pneumatic tire, constructed according to the present invention, Figure 2 is a fragmentary side view of the same, with parts broken away and parts shown in section, Figure 3 is a cross section taken on the line 3—3 in Figure 1, Figure 4 is a fragmentary perspective view showing one of the sheathing plates and the method of weaving, Figure 5 is a fragmentary transverse section through the improved tire showing a slight modification.

Figure 6 is a fragmentary perspective view showing a modified form of the invention where the cords are interwoven transversely of the tire on each intermediate plate, Figure 7 is a similar view in which the cords are interwoven interlockingly with the two plates, and Figure 8 is an enlarged cross section taken on the line 8—8 in Figure 7.

Referring more particularly to the drawings, 10 designates a casing or shoe which may be of general form now embodied in balloon or high pressure tires, and the carcass of which may be made from rubber and fabric, as now commonly done.

In accordance with the present invention, I employ two sheets of metal or other appropriate material, indicated at 11 and 12. These sheets extend across the tread portion of the tire and down along the side walls of the tire as far as may be desired. In Figure 3, I have shown the metallic plates as terminating short of the beads 13 of the tire; while in Figure 5, the side edges of the sheet plates extend down and into such beads 13.

The sheathing may be made of any appropriate material, preferably oil tempered spring steel, which will provide the necessary resistance against penetration of sharp objects, and also yield the desired resiliency necessary in the tire, especially in the side walls thereof where the sheathing is carried down to the beads 13.

The plates 11 and 12 are each constructed with openings 14 and 15. These openings may be of any configuration, but they are preferably rectangular in order to provide straight end walls for receiving thereagainst the farbic cords or threads 16, which are woven through the openings, as will be hereinafter described. As shown more particularly in Figures 1 and 2, the openings are arranged in circumferentially and transversely intersecting rows, with the openings of one row staggered with respect to those of an adjacent row.

100

The cords 16, as more particularly shown in Figure 4, are carried from one side of the plate or sheath to the other alternately through the openings of such plate, and adjacent cords are threaded in alternately opposite sides, that is to say, one cord will be passed over the outer side of the sheathing plate and at its opposite ends carried down through the two adjacent openings and beneath the plate until it reaches the next pair of openings, whereupon this thread is again brought to the upper side of the plate. Whereas the next adjacent cord will be initially passed on the underside of the plate and brought up through the next adjacent openings to the upper side of the plate, and so on, as clearly shown in Figure 4, whereby both faces of both of the plates 11 and 12 will present corded faces disposed in spaced groups with the cords crossing, as indicated at 17, in the openings 14; and consequently, at the points of intersection 17, the groups of cords will present a lesser thickness than where the groups of cords pass over and under the blank portions 18 of the plates between adjacent openings 14. This arrangement will provide for alternate thick and thin portions of the sheathing composed of the plate and cords, and it will thereby enable the rubber of the tire carcass to incorporate itself more thoroughly with the sheathing and will react to avoid casual shifting of the sheathing within the carcass.

It will be understood, of course, that although the groups of cords are shown as extending in a circumferential direction, such groups of cords might be woven transversely across the tire, or such groups might be woven both circumferentially and transversely; or the groups might be woven diagonally, or in any other manner desirable.

The tire at its inner portion is provided with a web 19 of any appropriate construction, such as vulcanized rubber and reinforced canvas or fabric. This web extends continuously with the beads 13 and is made and vulcanized therewith, so as to provide an internal and continuous construction with the remainder of the tire casing. Thereby, an internal confined air chamber is provided directly in the tire casing itself, into which compressed air is introduced through the usual valve stem, shown at 20 in Figure 2.

I thereby dispense with the use of an inner tube and with the likelihood of sudden losses of pressure in the tires, which are ordinarily encountered with the use of present types of inner tubes. In other words, the air will be retained for longer periods of time within the casing chamber, and there will not be that likelihood of leakage, which occurs through the more or less porous inner tubes in which air leaks out through the inner tube about the flap and between the beads and rim of the present tires.

In the manufacture of the improved tire, the general conduct of tire making will be followed, except that the sheathing plates 11 and 12 will be placed in the mold, and the rubber of the carcass will be molded thereabout, a thin film of rubber entering between the plates 11 and 12 and attaching itself to the cords 16 which are woven through the plates.

The rubber will also flow through the openings 14 and 15, and thus pass from one side of the plates to the other and become vulcanized in a homogeneous mass throughout the tire casing, thus interlocking with the sheathing plates. Moreover, although metal will not readily attach itself to rubber in the vulcanization process, the cords 16 will become incorporated with the rubber, and as the plates mechanically carry the cords, the plates will also in this respect become further attached to the body of vulcanized rubber in the tire carcass.

The plates 11 and 12 will generally be mounted in pairs in the tires, with one plate so related to the other plate that the openings 14 of one plate will come opposite the blank portions 18 of the other plate 12. In this way, nails or other sharp objects entering the outer portion of the casing will encounter the blank portions of either one of the two sheaths, and be turned thereby against entering and puncturing the air chamber of the tire.

In order to assist in properly locking the plates with the openings 14 and 15 thereof in the offset relation referred to, I prefer to provide a flange 21 on one of the plates so located and positioned as to receive the side edge of the other plate. For instance, in Figure 3, the flange 21 is shown as provided upon the inner plate 11 and turned outwardly and upwardly in order to receive the adjacent edge of the companion plate 12.

However, in Figure 5, the flange 21' is shown as formed on the side edge of the outer plate 12 and as being bent inwardly and upwardly to receive the adjacent side edge of the inner plate 11.

It will, of course, be understood that the sheathing plates 11 and 12 might be used in the casing of the ordinary balloon tire, as at present in use, in which an inner tube is employed.

It will be appreciated that the openings in the two plates will in no sense at any time register, but the openings in one plate will always be opposed to the blank portions of the companion plate, and the two plates, as a unit, will present an impenetrable barrier whereby the air chamber within the casing will be effectively guarded against puncture.

It will, furthermore, be understood that in the process of vulcanization, the cords of the two plates will become incorporated and vulcanized not only to the rubber of the tire carcass, but the cords of one plate will also become vulcanized to the cords of the adjacent plate, so that this vulcanization of the cords will be an additional guarantee that the plates do not move relatively, and the alignment of the slots with the blank portions is thus preserved.

Referring more particularly to Figure 6, the sheath plate 11' is shown as having the cords woven transversely across the same and across the tire, instead of such cords extending circumferentially, as in Figures 1 to 5.

The cords are shown at 16'. One end 22 of a cord is carried upon the underside of the plate 11', thence upwardly through an opening 14' to the upper side of the plate or the cord is carried along to the next opening in the transverse row. Such cord is carried downwardly through this opening onto the lower side of the plate, and when reaching the third opening, it will again be carried through such opening to the upper side of the plate. One edge of the plate is indicated at 23, and the cords are looped, as indicated at 24, across this edge of the plate, thus forming a protection preventing the edge from cutting the adjacent portions of the rubber. In forming the loops, the cord is carried about one side of the plate over the edge 23 to the opposite side of the plate, and thence upwardly through the nearest opening 14', and interwoven with the openings of the plates in the transverse row, as shown in Figure 6, this return weave being alternate with respect to the weave of the strand of cord running in the opposite direction, so that the cords are crossed in the openings, as indicated at 25.

As shown more particularly in Figures 7 and 8, the plates 11ª and 12ª are mounted adjacent one another, and the cord 16ª is interlockingly woven with both plates, so as to hold same in a definite arrangement with the openings 14ª of one plate opposite the blank portions of the other plate, and the openings 15ª of the plate 12ª are disposed opposite the blank portions of the plate 11ª.

One terminate end of the cord 16ª is knotted, as shown at 26, after being looped about one edge of the plate 11ª, and through one of the openings 14ª. The cord is then carried down from the knot 26 and about the adjacent edge of the companion plate 12ª, the cords being carried down the lower edge of the plate 12ª and up through the opening 15ª which first presents itself. This diagonal strand 27 of the cord is carried also through the second opening 14ª of the upper plate 11ª, the strand being brought along the upper side of the upper plate 11ª until reaching the third opening of the upper plate. The strand is then carried down diagonally, as indicated at 28, and passed through the openings in the upper and lower plates, as shown, being again carried beneath the lower plate. This process of weaving is carried on until when the cord reaches the opposite edges of the two plates it is carried upwardly, as shown at 29, across the edges of both plates and to the upper side of the upper plate 11ª. On reaching the opening 14ª, which first presents itself, this strand is carried down diagonally, as indicated at 30, through the adjacent openings in the two plates and to the underside of the lower plate 12ª, the strands being crossed, as indicated at 31, in one of the openings. It will thus be understood that the strand running in one direction will cross alternately in the openings of the upper and lower plates, and that the cords will thus hold the plates in a definite relation, and when such cords become vulcanized in the tire, they serve to incorporate the plates firmly within the carcass of the casing.

It will be obvious that many changes in the construction, combination and arrangement of parts could be made, which could be used without departing from the spirit of my invention, and I do not mean to limit the invention to such details, except as particularly pointed out in the claim.

Having thus described by invention, what I claim and desire to secure by Letters Patent of the United States is:—

An improved pneumatic tire comprising a casing, a pair of sheath plates extending circumferentially and transversely of the tread of the tire incorporated in the casing, and having openings therein disposed in transverse rows, the openings of one plate being offset from the openings in the other plate, and cords vulcanized in the casing, each strand of the cords being looped about one edge of the upper plate and secured thereto, said strand being carried down and about the edge of the lower plate in engagement with the lower surface of the lower plate thence through the first opening in the lower plate and the second opening in the upper plate, the strand being brought along the upper surface of the upper plate and passed downwardly through the third openings of the upper and lower plates, the strand being passed beneath the surface of the lower plate and passed upwardly and looped about the other edges of the plates, the strand being carried across the upper surface of the plate, said strand being threaded in the opposite direction through the same openings but in an alternate sense, the strand crossing itself alternately in the openings of the upper and lower plates.

ANDRE L. BROUSSARD.